United States Patent
Anderson et al.

(10) Patent No.: US 9,336,119 B2
(45) Date of Patent: May 10, 2016

(54) MANAGEMENT OF PERFORMANCE LEVELS OF INFORMATION TECHNOLOGY SYSTEMS

(71) Applicant: International Business Machines Corporation, Armonk, NY (US)

(72) Inventors: Eric M. Anderson, Friendswood, TN (US); Christopher J. Dawson, Arlington, VA (US); Rajesh Radhakrishnan, Reston, VA (US)

(73) Assignee: GLOBALFOUNDRIES INC., Grand Cayman (KY)

(*) Notice: Subject to any disclaimer, the term of this patent is extended or adjusted under 35 U.S.C. 154(b) by 214 days.

(21) Appl. No.: 14/088,751

(22) Filed: Nov. 25, 2013

(65) Prior Publication Data
US 2015/0149826 A1    May 28, 2015

(51) Int. Cl.
| | | |
|---|---|---|
| G06F 11/00 | (2006.01) | |
| G06F 11/34 | (2006.01) | |
| G06F 11/07 | (2006.01) | |
| G06F 11/30 | (2006.01) | |

(52) U.S. Cl.
CPC ........ *G06F 11/3476* (2013.01); *G06F 11/0793* (2013.01); *G06F 11/3065* (2013.01); *G06F 11/3409* (2013.01); *G06F 11/3495* (2013.01)

(58) Field of Classification Search
CPC ............ G06F 11/3476; G06F 11/3409; G06F 11/0793; G06F 11/3495
See application file for complete search history.

(56) References Cited

U.S. PATENT DOCUMENTS

| | | | |
|---|---|---|---|
| 7,082,441 B1* | 7/2006 | Zahavi ............... | G06F 11/3476 |
| 7,398,429 B2 | 7/2008 | Shaffer et al. | |
| 8,265,973 B2 | 9/2012 | Radhakrishnan | |
| 8,606,894 B1* | 12/2013 | Fremont ............... | G06F 9/5061 |
| | | | 709/223 |
| 2004/0059966 A1* | 3/2004 | Chan ................... | G06F 11/0709 |
| | | | 714/48 |
| 2006/0075308 A1* | 4/2006 | Haselden ............ | G06F 11/3476 |
| | | | 714/39 |
| 2006/0184529 A1 | 8/2006 | Berg et al. | |
| 2008/0168531 A1 | 7/2008 | Gavin | |
| 2009/0100113 A1* | 4/2009 | Burghard .......... | G06F 17/30368 |

(Continued)

FOREIGN PATENT DOCUMENTS

EP    2042960 A2    4/2009

OTHER PUBLICATIONS

Anonymous Authors, "Applied test cases to defect traces", An IP.com Prior Art Database Technical Disclosure, IPCOM000220173D, Published Jul. 24, 2012 <http://ip.com/IPCOM/000220173>.

(Continued)

*Primary Examiner* — Yolanda L Wilson
(74) *Attorney, Agent, or Firm* — David Cain; Andrew M. Calderon; Roberts Mlotkowski Safran & Cole, P.C.

(57) ABSTRACT

A method for monitoring information systems has been provided. The method includes analyzing at least one event data record of an information technology system to determine whether at least one target system of the information technology system has monitoring levels, trace levels, log levels, or snap shot levels which should be changed. The method further includes based on the analyzed instructing the at least one target system to change their monitoring levels, trace levels, log levels, or snap shot levels. The method further includes analyzing said monitoring levels, trace levels, log levels, or snap shot levels of the at least one target system to determine a cause of the at least one event data record.

20 Claims, 3 Drawing Sheets

(56) References Cited

U.S. PATENT DOCUMENTS

2011/0078106 A1* 3/2011 Luchi .................. G06F 11/3452
  706/48
2012/0030346 A1* 2/2012 Fukuda ............... G06F 11/0709
  709/224
2013/0227352 A1* 8/2013 Kumarasamy ...... G06F 11/3072
  714/47.1

OTHER PUBLICATIONS

Anonymous Authors, "Method and System for Automating Execution of Test Cases Based on Monitored Events", An IP.com Prior Art Database Technical Disclosure, IPCOM000210830D, Published Sep. 12, 2011, <http://ip.com/IPCOM/000210830>.

* cited by examiner

MANAGEMENT OF PERFORMANCE LEVELS OF INFORMATION TECHNOLOGY SYSTEMS

FIELD OF THE INVENTION

The present invention relates generally to monitoring of information systems and more particularly to management of monitored levels, trace levels, log levels, or snap shot levels of information technology (IT) systems based on analysis of events of IT systems.

BACKGROUND

An operating system is a software program or a collection of software programs that operate on a computer to provide a platform on which software applications can execute. Examples of operating systems include, for example, Advanced Interactive eXecutive AIX® (AIX is a registered trademark of International Business Machines Corporation in the United States, other countries or both), IBM® z/VSE® (Virtual Storage Extended) (IBM and z/VSE are registered trademarks of International Business Machines Corporation in the United States, other countries or both), Linux® on System z® (Linux is a registered trademark of Linus Torvalds in the United States, other countries or both, and System z is a registered trademark of International Business Machines Corporation in the United States, other countries or both), and the like. In addition, operating systems typically perform essential functions required to maintain proper operation of software applications executing on the computer. However, some software applications may experience error conditions. Further, a software error or crash can cause other software executing on the computer to cease execution of program instructions. A software developer or systems administrator may correct a defect in a software program to improve reliability and performance of the software program. Further, in order to correct the defect in the software program, software developers typically employ a variety of methods or tools. Tracing of a software program is a specialized use of logging record information relating to execution of an operating system of software programs. The logged record of information can be used by the software developer to debug errors of the operating system.

SUMMARY

In one embodiment of the present invention, computer-implemented method for monitoring information technology systems is provided. The computer-implemented method comprises analyzing, by one or more processors, at least one event data record of an information technology system to determine whether at least one target system of the information technology system has monitoring levels, trace levels, log levels, or snap shot levels which should be changed. The method further comprises based on the analyzed at least one event data record of the information technology system, instructing, by the one or more processors, the at least one target system to change its monitoring levels, trace levels, log levels, or snap shot levels. The method further comprises analyzing, by the one or more processors, said monitoring levels, trace levels, log levels, or snap shot levels of the at least one target system to determine a cause of the at least one event data record.

In another embodiment of the present invention, a computer system for monitoring information technology systems is provided. The computer system comprises one or more processors, one or more computer-readable memories, one or more computer-readable tangible storage devices, and program instructions which are stored on at least one of the one or more storage devices for execution by at least one of the one or more processors via at least one of the one or more memories. The computer system further comprises program instructions to analyze at least one event data record of an information technology system to determine whether at least one target system of the information technology system has monitoring levels, trace levels, log levels, or snap shot levels which should be changed. The computer system further comprises program instructions to instruct the at least one target system to change its monitoring levels, trace levels, log levels, or snap shot levels. The computer system further comprises program instructions to analyze said monitoring levels, trace levels, log levels, or snap shot levels of the at least one target system to determine a cause of the at least one event data record. The computer system further comprises program instructions to analyze said monitoring levels, trace levels, log levels, or snap shot levels of the at least one target system to determine a cause of the at least one event data record.

In yet another embodiment of the present invention, a program product for monitoring information technology systems is provided. The computer program product comprising one or more computer-readable tangible storage devices and program instructions stored on at least one of the one or more storage devices. The computer system further comprises program instructions to analyze at least one event data record of an information technology system to determine whether at least one target system of the information technology system has monitoring levels, trace levels, log levels, or snap shot levels which should be changed. The computer system further comprises program instructions to instruct the at least one target system to change its monitoring levels, trace levels, log levels, or snap shot levels. The computer system further comprises program instructions to analyze said monitoring levels, trace levels, log levels, or snap shot levels of the at least one target system to determine a cause of the at least one event data record.

BRIEF DESCRIPTION OF THE SEVERAL VIEWS OF THE DRAWINGS

Novel characteristics of the invention are set forth in the appended claims. The invention will best be understood by reference to the following detailed description of the invention when read in conjunction with the accompanying Figures, wherein like reference numerals indicate like components, and:

DETAILED DESCRIPTION

Figure 1:
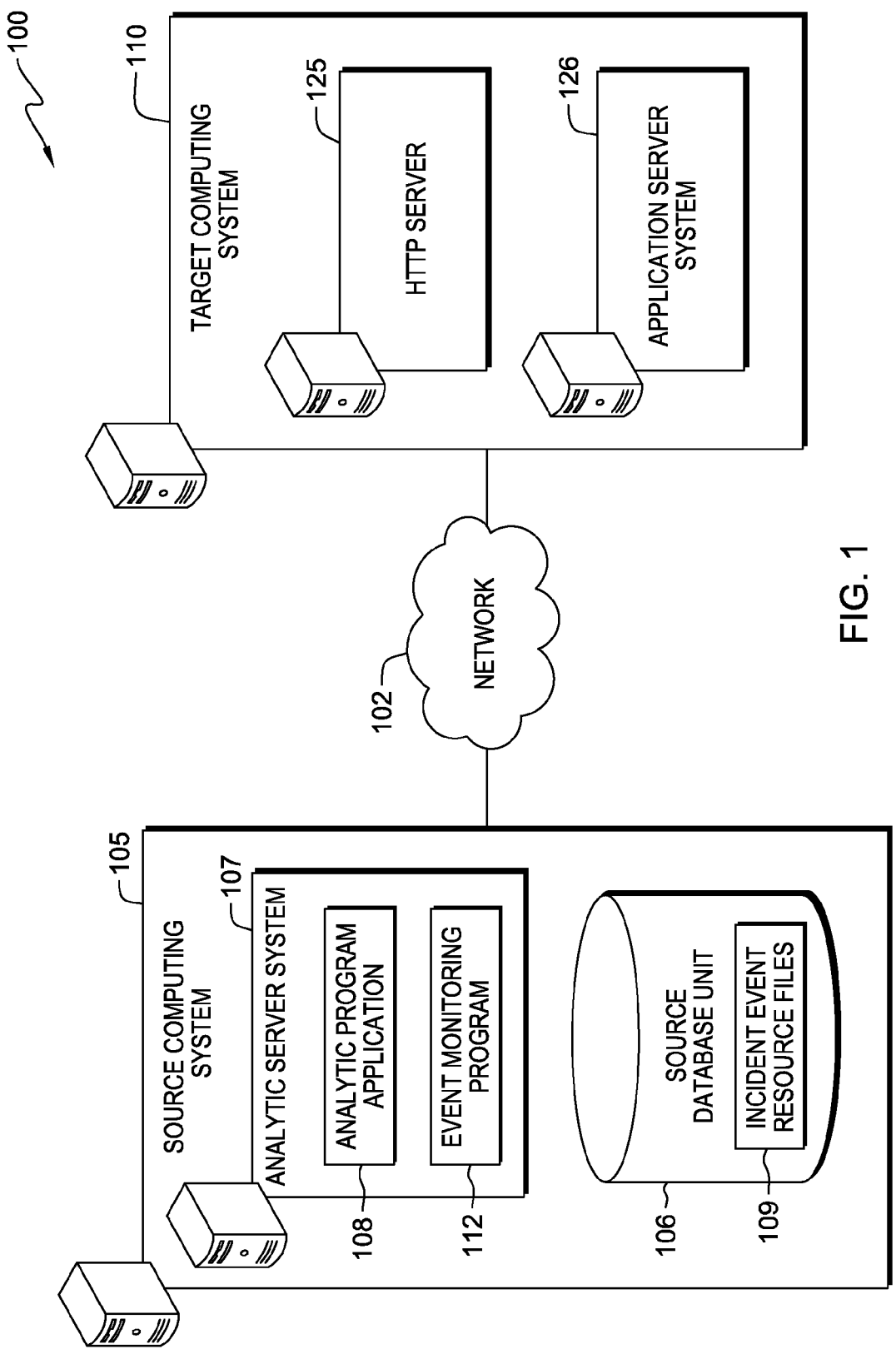
FIG. 1 is a functional diagram of an information technology (IT) log level processing system for analyzing current or historic event data records of a target IT system, in accordance with embodiments of the present invention.

Embodiments of the present invention include an analytic engine of a source computing system that determines whether to change monitoring levels, trace levels, log levels, or snap shot levels of a target computing system in an information technology (IT) system environment, wherein the determination is based on an analysis of current or historical events of the target computing system, in accordance with the present invention.

The analytic engine utilizes a series of rules to determine whether the monitoring levels, trace levels, log levels, or snap shot levels should be changed, in accordance with at least one embodiment. A first rule that is utilized by the analytic engine is based on an analysis of future need for changes or upgrades to monitoring levels, trace levels, log levels, or snap shot levels of the target computing system, wherein the analytic engine examines the target computing system for all upcoming changes or upgrades. The analytic engine then determines configuration items (CIs) of the target computing system that are associated with these changes or upgrades. The analytic engine further determines additional computing systems of the target computing system that are represented by the CIs and determines if any changes to monitoring levels, trace levels, log levels, or snap shot levels of the additional computing systems of the target computing system needs to be made.

A second rule that is utilized by the analytic engine is based on reoccurring incidences of current or historical events, wherein the analytic engine modifies or changes monitoring levels, trace levels, log levels, or snap shot levels of the target computing system that is experiencing, or has experienced, reoccurring operational incidences or issues. A third rule that is utilized by the analytic engine to determine whether to change the monitoring levels, trace levels, log levels, or snap shot levels of the target computing system can be based on a determination of whether to change monitoring levels, trace levels, log levels, or snap shot levels of other additional computing systems of target computing system, including, for example, web servers or management servers of the target computing system based on a resolution of determination of the first and the second rule.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer readable storage medium. A computer-readable storage medium may be, for example, but not limited to, an electronic, a magnetic, an optical, an electromagnetic, an infrared, or a semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with a computer-readable program code embodied therein, for example, in baseband or as part of a carrier wave. Such a propagated signal may take any of a variety of forms, including, but not limited to, electro-magnetic, optical, or any suitable combination thereof.

A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products, according to embodiments of the invention. It will be understood that each block of the flowchart illustrations and/or block diagrams and combinations of blocks in the flowchart illustrations and/or block diagrams can be implemented by computer program instructions. These computer program instructions may be provided to a processor of a general purpose computer, special purpose computer, or other programmable data processing apparatus to produce a machine, such that the instructions, which executes via the processor of the computer or other programmable data processing apparatus, creates means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions, which execute on the computer or other programmable apparatus, provide processes for implementing the functions/acts specified in the flowchart and/or block diagram block or blocks.

The present invention will now be described in detail with reference to the accompanying Figures. Referring now to FIG. 1, a functional diagram of information technology (IT) log level processing system 100 for analyzing current or historic event data records of a target IT system is shown. The target IT system is analyzed to determine whether monitoring levels, trace levels, log levels, or snap shot levels of the target IT system need to be modified based on the analyzed current or historic event data records of the target IT system. IT log level processing system 100 includes source computing system 105 and target computing system 110, interconnected over network 102, in accordance with embodiments of the present invention.

Network 102 includes one or more networks of any kind that can provide communication links between various devices and computers connected together within IT log level processing system 100. Network 102 can also include connections, such as wired communication links, wireless communication links, or fiber optic cables. Network 102 can also be implemented as a number of different types of networks, including, for example, a local area network (LAN), a wide area network (WAN), a packet switched telephone network (PSTN), or some other networked system. For example, IT log level processing system 100 can utilize the Internet with network 102 representing a worldwide collection of networks. The term "Internet", as used according to embodiments of the present invention, refers to a network or networks that uses certain protocols, such as the TCP/IP protocol and possibly other protocols, such as the hypertext transfer protocol (HTTP), for hypertext markup language (HTML) documents that make up the World Wide Web (The Web).

Source computing system 105 is a server computing system such as, a management server, a web server, or any other electronic device or computing system. The server computing system 105 can also represent a "cloud" of computers interconnected by one or more networks, wherein the server computing system 105 can be a primary server for a computing system utilizing clustered computers when accessed through a virtual computing environment of source computing system 105. A cloud computing system can be a common implementation of IT log level processing system 100 for analyzing current or historic event data records of target computing system 110 to determine whether monitoring levels, trace levels, log levels, or snap shot levels of target computing system 110 needs to be modified or changed based on the analyzed current or historic event data record of target computing system 110.

Source computing system 105 includes source database unit 106 and analytic server system 107. Source database unit 106 is any type of storage device, storage server, storage area network, redundant array of independent discs (RAID), cloud storage service, or any type of data storage. A database storage device can be, for example, DB2® (DB2 is a registered trademark of International Business Machines Corporation in the United States, other countries or both). DB2® can be a relational model database server. The relational model for database management of source database unit 106 is a database model based on first-order predicate logic. In the relational model of a database, all data is represented in terms of tuples, grouped into relations. A database organized in terms of the relational model is a relational database. A relation of the relational model is defined as a set of tuples that have the same attributes.

Source database unit 106 can also be a configuration management database (CMDB). CMBD is a database warehouse that includes information pertaining to storage of an organization's IT infrastructure, including, for example, event data records of IT log level processing system 100. Source database unit 106 further includes incident event resource files 109. Incident event resource files 109 include information pertaining to current or historical event data records or execution of operational measures of target computing system 110.

For example, the event data record is recorded by source computing system 105 in incident event resource files 109 based on transactions or program executions of one or more systems application programs or system software that operate at various monitoring levels, trace levels, log levels, or snap shot levels of target service system in target computing system 110. According to at least one embodiment, the event data record can be recorded in logs of incident event resource files 109 based on input data or files, referenced data or files, output data, and all associated metadata of the current or historical event data record of target computing system 110. The event data record is retrieved from incident event resource files 109 by source computing system 105 to analyze whether target computing system 110 has monitoring levels, trace levels, log levels, or snap shot levels which should be changed.

Analytic server system 107 is a server computing system such as, a management server, a web server, or any other electronic device or computing system. The server computing system can also represent a "cloud" of computers interconnected by one or more networks wherein the server computing system can be a primary server for a computing system utilizing clustered computers when accessed through a virtual computing environment of source computing system 105. A cloud computing system of an analytic server can be a common implementation of a management IT system that analyzes current and historical events of system target computing system 110 to determine whether monitoring levels, trace levels, log levels, or snap shot levels of the target computing system 110 needs to be modified. Analytic server system 107 includes analytic program application 108 and event monitoring program 112.

Analytic program application 108 analyzes current and historical events of target computing system 110 and determines whether to change monitoring levels, trace levels, log levels, or snap shot levels of a target computing system, wherein the determination is based on an analysis of current or historical events of the target computing system, as described below, in accordance with embodiments of the present invention. Analytic program application 108 uses a series of rules to determine monitoring levels, trace levels, log levels, or snap shot levels of a target computing system.

A first rule that is utilized by analytic program application 108 is based on an analysis of future need for changes to monitoring levels, trace levels, log levels, or snap shot levels of the target computing system 110, wherein analytic program application 108 examines target computing system 110 for all upcoming changes or upgrades of target computing system 110. Analytic program application 108 also determines configuration items (CIs) of the target computing system 110 that are associated with these changes. Moreover, analytic program application 108 further determines whether additional web servers or computing systems of target computing system 110 are represented by the CIs and determines if any changes are needed to monitoring levels, trace levels, log levels, or snap shot levels of the additional computing systems that are represented by the ICs of target computing system 110.

A second rule that is utilized by analytic program application 108 is based on an examination of reoccurring incidences of current or historical events of target computing system 110, wherein analytic program application 108 modifies or changes monitoring levels, trace levels, log levels, or snap shot levels target computing system 110, that is experiencing or has experienced reoccurring operational incidences or issues. For example, if there is a pattern of reoccurring operational incidences or issues of target computing system 110, or for instance, if there are more than two incidents of reoccurring operational incidences or issues in a twenty-four (24) hour period, then analytic program application 108 determines to see if the monitoring levels, trace levels, log levels, or snap shot levels target computing system 110 should be increased based on the reoccurring operational incidences or issues. A third rule that is utilized by analytic program application 108 to determine whether to change the monitoring levels, trace levels, log levels, or snap shot levels of target computing system 110 can be based on a determination of whether to change monitoring levels, trace levels, log levels, or snap shot levels of other additional computing systems of target computing system, including, for example, web servers or management servers of target computing system 110 based on the determination of the first and the second rule to change or modify monitoring levels, trace levels, log levels, or snap shot levels target computing system 110.

For example, if the resolution of reoccurring incidences of current or historical events of target computing system 110 is not known, or was specific to the type of additional server of target computing system 110, like a patch level of the additional server or additional computing systems is malfunctioned, then analytic program application 108 determines that monitoring levels, trace levels, log levels, or snap shot levels of other computing systems of target computing system 110 should be changed. According to at least one embodiment, based on the determination, analytics program application 108 instructs target computing system 110 to change its monitoring levels, trace levels, log levels, or snap shot levels specified period of time. Analytic program application 108 may also use current or historical event data records, as well as configuration management data of source computing system 105 to understand and determine which additional computing systems or system applications of target computing system 110 that may be candidates to change their log level.

Event monitoring program 112 monitors current or historical event data records of target computing system 110, wherein monitoring of current or historical event data records of target computing system 110 occurs periodically, randomly, and/or using event-based monitoring of program actions to monitors current events of target computing system 110. Event monitoring program 112 transmits the monitored current or historic event data of target computing system 110 to incident event resource files 109 of source database unit 106 for future retrieval by analytic program application 108, wherein analytic program application 108 utilizes event data record of event monitoring program 112 to determine whether monitoring levels logging and tracing of target computing system 110 should be changed to a heightened or increased level.

Target computing system 110 is a server computing system such as, a management server, a web server, or any other electronic device or computing system. The server computing system can represent a "cloud" of computers interconnected by one or more networks, wherein the server computing system can be a primary server for a computing system utilizing clustered computers when accessed through IT log level processing system 100.

A cloud computing system of target computing system 110 can be a common implementation of a management IT system that is analyzed by an analytic engine of source computing system 105 to determine whether to change or modify monitoring levels, trace levels, log levels, or snap shot levels of target computing system 110 based on current and historical events of system operations of target computing system 110. Target computing system 110 includes one or more systems application programs, operating systems (OS), web server systems or system software that operate at various monitoring levels, trace levels, log levels, or snap shot levels, in accordance with at least one embodiment of the present invention.

The present invention is adapted to dynamically change monitoring levels, trace levels, log levels, or snap shot levels of target computing system 110 based on current or historical events or execution of operational measures of target computing system 110. According to at least one embodiment, the current or historical events of operational measures can be event data records of target computing system 110. The event data record is recorded by target computing system 110 based on transactions or program executions of one or more system application programs or system software that operate at various monitoring levels, trace levels, log levels, or snap shot levels of target computing system 110.

As described above, the event data record can be recorded and stored in logs based on input data or files, referenced data or files, output data, and all associated metadata of the current or historical event data record of target computing system 110. According to at least one embodiment, the event data is analyzed by source computing system 105 to determine whether the target service system has monitoring levels, trace levels, log levels, or snap shot levels which should be changed. Based on the analyzed event data record, the target computing system 110 can be triggered by source computing system 105 to change or modify its monitoring levels, trace levels, log levels, or snap shot levels, as described in further detail below. The monitoring levels, trace levels, log levels, or snap shot levels are further analyzed to determine a cause of system operations measures of the event data record of target computing system 110, in accordance with at least one embodiment of the present invention.

Consider, for, example, a system malfunction of a web server of target computing system 110 that causes operational measures of target computing system 110 to become unavailable. In this manner, monitoring levels, trace levels, log levels, or snap shot levels of target computing system 110 are set to "critical". Thus, any additional logging levels, including, any monitoring levels, trace levels, log levels, or snap shot levels can only be turned on for a small period of time due to the additional load and disk space required for logging of target computing system 110. In this example, it may be difficult to determine the issues affecting the malfunctioned web service of target computing system 110 when only examining the critical issues of the malfunctioned web service of the target service system that is recorded in the log.

The present invention is adapted to detect that there are a higher than normal amount of events or other ticketing information of the malfunctioned web server of target computing system 110. The present invention is further adapted to analyze the event or service information of target computing system 110, and based on the analyzed event or service information, the present invention is further adapted to trigger an increase in log levels of target computing system 110, including monitoring levels, trace levels, log levels, or snap shot levels, wherein the triggered log level is adapted to changed or modify the log levels of target computing system 110 from critical to debug status for predetermined or short periods of time. Target computing system 110 system includes HTTP server 125 and application server system 126.

Target computing system 110 can also include additional computing systems, or system applications, that operate within a target based on monitored levels, trace levels, log levels, or snap shot levels, in accordance with the present invention. HTTP server 125 delivers service content, including web server contents to components to target computing system 110. For example, application server system 126 is dependent on HTTP server 125 to deliver the web content of target computing system 110. Application server system 126 is a software framework of target computing system 110 that provides execution of procedures (programs, routines, and scripts) for supporting applied applications of target computing system 110. According to at least one embodiment, HTTP server 125 and application server system 126 operate at various monitoring levels, trace levels, log levels, or snap shot levels, wherein the various monitoring levels, trace levels, log levels, or snap shot levels of HTTP server 125 and application server system 126 server are analyzed by source computing system 105. The various monitoring levels, trace levels, log levels, or snap shot levels of HTTP server 125 and application server system 126 can be changed based on current or historical events or execution of operational measures of HTTP server 125 and application server system 126.

Figure 2:
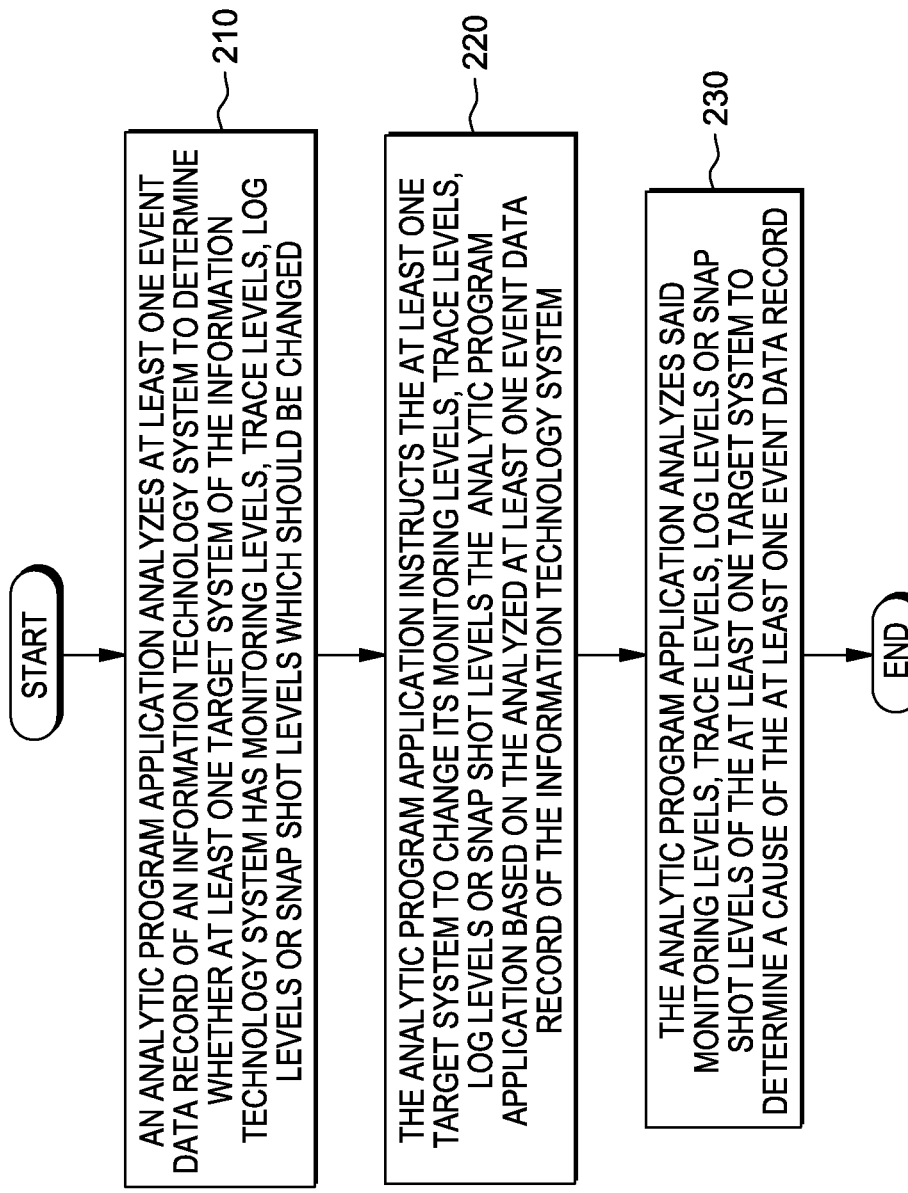
FIG. 2 is a flow diagram depicting steps performed in an analytic program application to determine whether to change monitoring levels, trace levels, log levels, or snap shot levels of a target computing system, wherein the determination is based on an analysis of current or historical events of the target computing system, in accordance with embodiments of the present invention.

FIG. 2 is one embodiment of a flow diagram depicting steps performed by analytic program application 108 to determine whether to change monitoring levels, trace levels, log levels, or snap shot levels of target computing system 110, wherein the determination is based on an analysis of current or historical events of target computing system 110, in accordance with embodiments of the present invention.

Analytic program application 108 analyzes at least one event data record, including, for example, current or historical events of event data records of target computing system 110 to determine whether target computing system 110 has monitoring levels, trace levels, log levels, or snap shot levels which should be changed. (Step 210). The event data record is recorded in logs of incident event resource files 109 based on input data or files, referenced data or files, output data, and all associated metadata of the current or historical event data record. According to at least one embodiment, analytic program application 108 instructs target computing system 110 to change its monitoring levels, trace levels, log levels, or snap shot levels based on the analyzed at least one event data record of target computing system 110. (Step 220).

Analytic program application 108 further increases it monitoring levels, trace levels, log levels, or snap shot levels of target computing system 110, wherein the monitoring levels, trace levels, log levels, or snap shot levels are increased to examine additional monitoring levels, trace levels, log levels, or snap shot levels which should be changed of other computing systems of target computing system 110. Analytic program application 108 further records the event data record of target computing system 110 if it is determined that target computing system 110 does not have monitoring levels, trace levels, log levels, or snap shot levels which should be changed. Analytic program application 108 further changes monitoring levels, trace levels, log levels, or snap shot levels to target computing system 110 for a specific period of time if it is determined that target computing system 110 has monitoring levels, trace levels, log levels, or snap shot levels which should be changed. Analytic program application 108 further analyzes monitoring levels, trace levels, log levels, or snap shot levels of the target computing system 110 to determine a cause of the at least one event data record. (Step 230).

Figure 3:
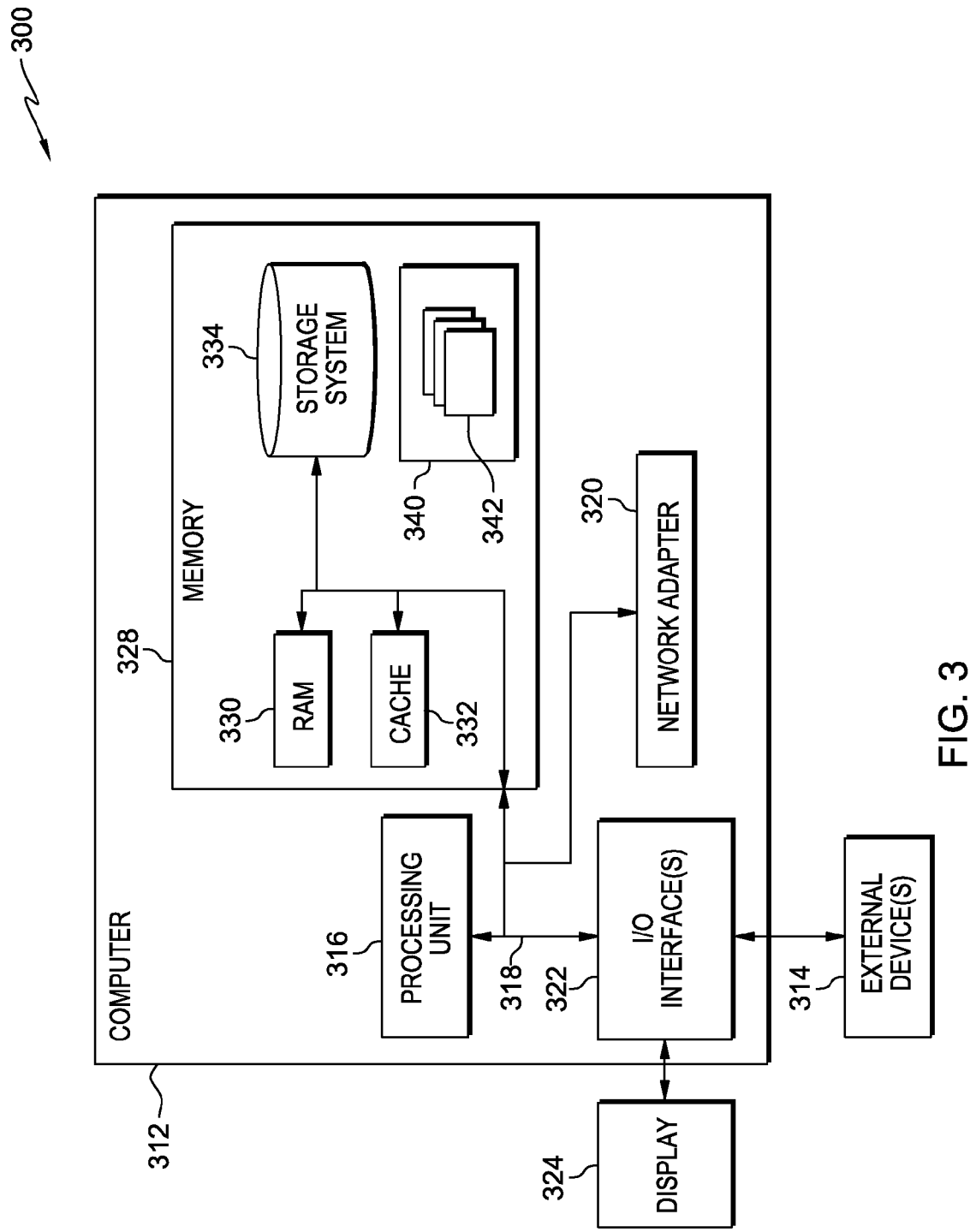
FIG. 3 illustrates a block diagram of components of a computer system, in accordance with embodiments of the present invention.

FIG. 3 is a block diagram of a computer system, in accordance with an embodiment of the present invention. Computer system 300 is only one example of a suitable computer system and is not intended to suggest any limitation as to the scope of use or functionality of embodiments of the invention described herein.

Regardless, computer system 300 is capable of being implemented and/or performing any of the functionality set forth hereinabove. In computer system 300 there is computer 312, which is operational with numerous other general purpose or special purpose computing system environments or configurations. Examples of well-known computing systems, environments, and/or configurations that may be suitable for use with computer 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Source computing system 105 and target computing system 110 can be implemented as an instance of computer 312.

Computer 312 may be described in the general context of computer system executable instructions, such as program modules, being executed by a computer system. Generally, program modules may include routines, programs, objects, components, logic, data structures, and so on that perform particular tasks or implement particular abstract data types. Computer 312 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 3, computer 312 is shown in the form of a general-purpose computing device. The components of computer 312 may include, but are not limited to, one or more processors or processing units 316, memory 328, and bus 318 that couples various system components including memory 328 to processing unit 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 312 typically includes a variety of computer system readable media. Such media may be any available media that is accessible by computer 312 and includes both volatile and non-volatile media, and removable and non-removable media.

Memory 328 includes computer system readable media in the form of volatile memory, such as random access memory (RAM) 330 and/or cache 332. Computer 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Analytic program application 108 and event monitoring program 112 can be stored in memory 328 by way of example, and not limitation, as well as an operating system, one or more application programs, other program modules, and program data. Each of the operating systems, one or more application programs, other program modules, and program data or some combination thereof, may include an implementation of a networking environment. Program modules 342 generally carry out the functions and/or methodologies of embodiments of the invention as described herein. Analytic program application 108 and event monitoring program 112 can be implemented as an instance of program 340.

Computer 312 may also communicate with one or more external device(s) 314 such as a keyboard, a pointing device, etc., as well as display 324; one or more devices that enable a user to interact with computer 312; and/or any devices (e.g., network card, modem, etc.) that enable computer 312 to communicate with one or more other computing devices. Such communication occurs via Input/Output (I/O) interface(s) 322. Still yet, computer 312 communicates with one or more networks such as a local area network (LAN), a general wide area network (WAN), and/or a public network (e.g., the Internet) via network adapter 320. As depicted, network adapter 320 communicates with the other components of computer 312 via bus 318. It should be understood that although not shown, other hardware and/or software components could be used in conjunction with computer 312. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method, or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, a magnetic, an optical, an electromagnetic, an infrared, or a semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object-oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for monitoring information technology systems has been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A computer-implemented method for monitoring information technology systems, the method comprising the steps of:
   analyzing, by one or more processors, at least one event data record of an information technology system to determine whether at least one target system of the information technology system has monitoring levels, trace levels, log levels, or snap shot levels which should be changed, wherein the analyzing the at least one event data record includes identifying a trend towards an operational incident or issue in the information technology system;
   based on the analyzed at least one event data record of the information technology system, instructing, by the one or more processors, the at least one target system to change its monitoring levels, trace levels, log levels, or snap shot levels; and
   analyzing, by the one or more processors, said monitoring levels, trace levels, log levels, or snap shot levels of the at least one target system to determine a cause of the at least one event data record.

2. The computer-implemented method according to claim 1, wherein the at least one event data record of the information technology system is a current or historical event data record, and wherein the current or historical event data record is recorded by the information technology system when a transaction is processed in the information technology system.

3. The computer-implemented method according to claim 2, wherein the event data record is recorded in logs based on input data or files, referenced data or files, output data, and all associated metadata of the current or historical event data record.

4. The computer-implemented method according to claim 1, wherein the step is based on the analyzed at least one event data record of the information technology system, instructing, by the one or more processors, the at least one target system to change it's monitoring levels, trace levels, log levels, or snap shot levels, further includes the step of:
   increasing, by the one or more processors, monitoring levels, trace levels, log levels, or snap shot levels of the at least one target system, wherein the monitoring levels, trace levels, log levels, or snap shot levels are increased to examine additional monitoring levels, trace levels, log levels, or snap shot levels of the at least one target system which should be changed.

5. The computer-implemented method according to claim 1, further including the step of:
   logging, by the one or more processors, the at least one event data record in a repository of the information technology system, if it is determined that the at least one target system of the information technology system does not have monitoring levels, trace levels, log levels, or snap shot levels which should be changed.

6. The computer-implemented method according to claim 1, further including the step of:
   changing, by the one or more processors, monitoring levels, trace levels, log levels, or snap shot levels of the at least one target system if it is determined that the at least one target system has monitoring levels, trace levels, log levels, or snap shot levels which should be changed.

7. The computer-implemented method according to claim 6, wherein the monitoring levels, trace levels, log levels, or snap shot levels of the at least one target system is modified for specified periods of time.

8. A computer system for monitoring information technology systems, the computer system comprising:
   one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
   program instructions to analyze at least one event data record of an information technology system to determine whether at least one target system of the information technology system has monitoring levels, trace levels, log levels, or snap shot levels which should be changed, wherein the analyzing the at least one event data record includes identifying a trend towards an operational incident or issue in the information technology system;
   program instructions to instruct the at least one target system to change its monitoring levels, trace levels, log levels, or snap shot levels; and
   program instructions to analyze said monitoring levels, trace levels, log levels, or snap shot levels of the at least one target system to determine a cause of the at least one event data record.

9. The computer system according to claim 8, wherein the at least one event data record of the information technology system is a current or historical event data record, and wherein the current or historical event data record is recorded by the information technology system when a transaction is processed in the information technology system.

10. The computer system according to claim 9, wherein the event data record is recorded in logs based on input data or files, referenced data or files, output data, and all associated metadata of the current or historical event data record.

11. The computer system according to claim 8, wherein program instructions to instruct the at least one target system to change its monitoring levels, trace levels, log levels, or snap shot levels, further includes:
   program instructions to increase has monitoring levels, trace levels, log levels, or snap shot levels of the at least one target system, wherein the log levels are increased to interpret monitoring levels, trace levels, log levels, or snap shot levels of the target system which should be changed.

12. The computer system according to claim 8, further including:
   program instructions to log the at least one event data record in a repository of the information technology system, if it is determined that the at least one target system of the information technology system does not have monitoring levels, trace levels, log levels, or snap shot levels which should be changed.

13. The computer system according to claim 8, further including:

program instructions to change monitoring levels, trace levels, log levels, or snap shot levels of the at least one target system if it is determined that the at least one target system has monitoring levels, trace levels, log levels, or snap shot levels which should be changed.

14. The computer system according to claim 13, wherein the monitoring levels, trace levels, log levels, or snap shot levels of the at least one target system is modified for specified periods to time.

15. A computer program product for monitoring information technology systems, the computer program product comprising:
one or more computer-readable tangible storage devices and program instructions stored on at least one of the one or more storage devices, the program instructions comprising:
program instructions to analyze at least one event data record of an information technology system to determine whether at least one target system of the information technology system has monitoring levels, trace levels, log levels, or snap shot levels which should be changed, wherein the analyzing the at least one event data record includes identifying a trend towards an operational incident or issue in the information technology system;
program instructions to instruct the at least one target system to change its monitoring levels, trace levels, log levels, or snap shot levels; and
program instructions to analyze said monitoring levels, trace levels, log levels, or snap shot levels of the at least one target system to determine a cause of the at least one event data record.

16. The computer program product according to claim 15, wherein the at least one event data record of the information technology system is a current or historical event data record, and wherein the current or historical event data record is recorded by the information technology system when a transaction is processed in the information technology system.

17. The computer program product according to claim 16, wherein the event data record is recorded in logs based on input data or files, referenced data or files, output data, and all associated metadata of the current or historical event data record.

18. The computer program product according to claim 15, wherein program instructions to instruct the at least one target system to change its monitoring levels, trace levels, log levels, or snap shot levels, further includes:
program instructions to increase has monitoring levels, trace levels, log levels or snap shot levels of the at least one target system, wherein the monitoring levels, trace levels, log level, or snap shot levels are increased to interpret monitoring levels, trace levels, log levels, or snap shot levels of the at least one target system which should be changed.

19. The computer program product according to claim 15, further including:
program instructions to log the at least one event data record in a repository of the information technology system, if it is determined that the at least one target system of the information technology system does not have monitoring levels, trace levels, log levels, or snap shot levels which should be changed.

20. The computer program product according to claim 15, further including:
program instructions to change monitoring levels, trace levels, log levels, or snap shot levels of the at least one target system if it is determined that the at least one target system has monitoring levels, trace levels, log levels, or snap shot levels which should be change.

* * * * *